Nov. 8, 1932.  C. K. HARRIS  1,887,350
SAW SET
Filed July 12, 1930    2 Sheets-Sheet 1
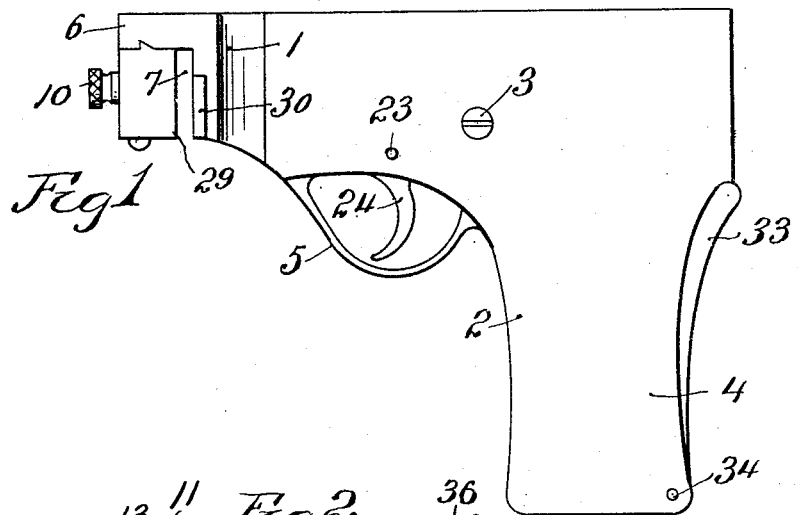
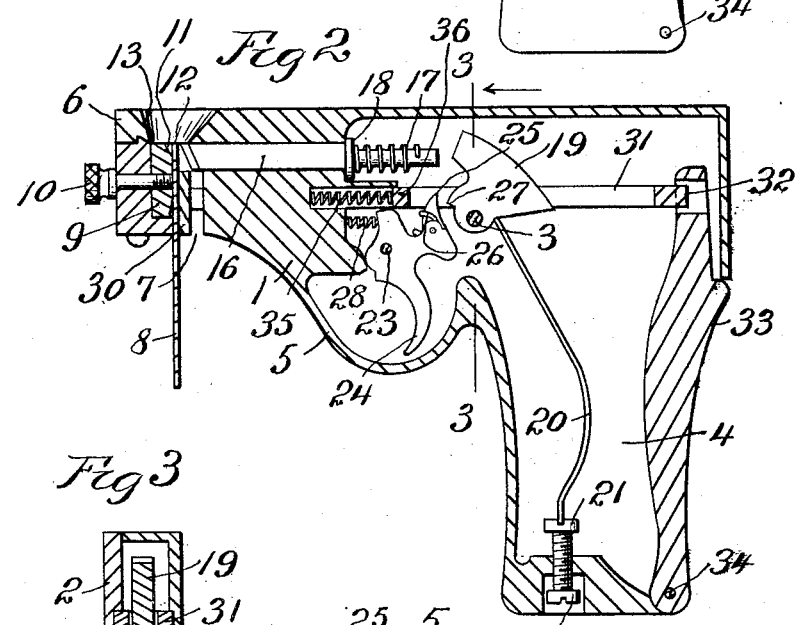
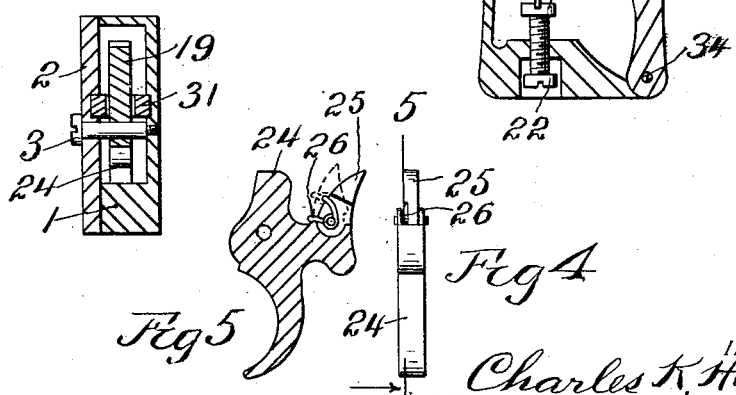
Witness
H. Vernon Olson
INVENTOR
Charles K. Harris
BY Warren D. House.
His ATTORNEY Nov. 8, 1932.  C. K. HARRIS  1,887,350
SAW SET
Filed July 12, 1930   2 Sheets-Sheet 2
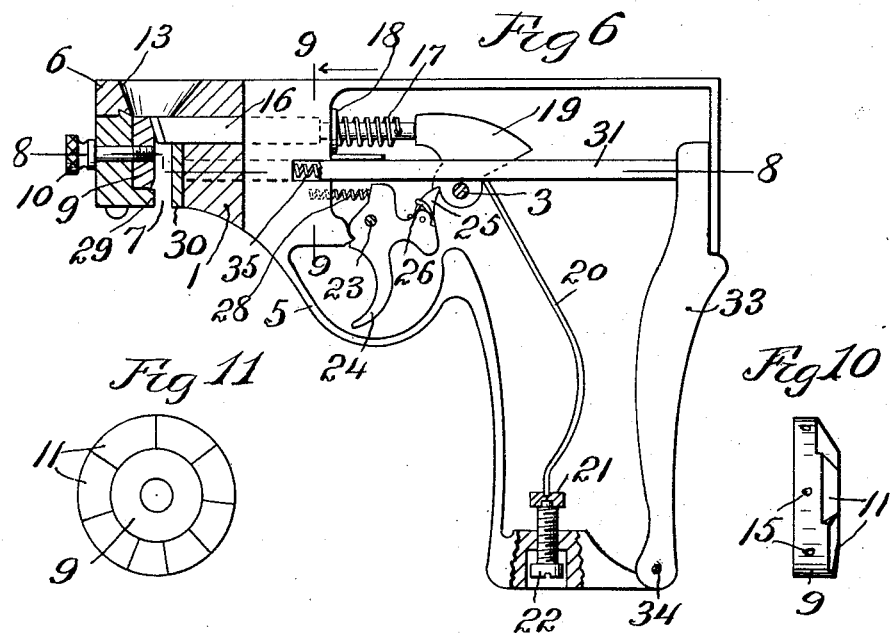
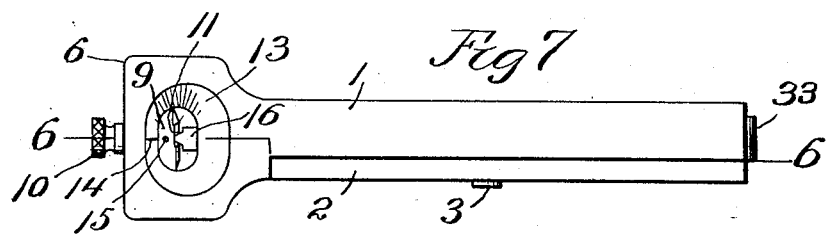
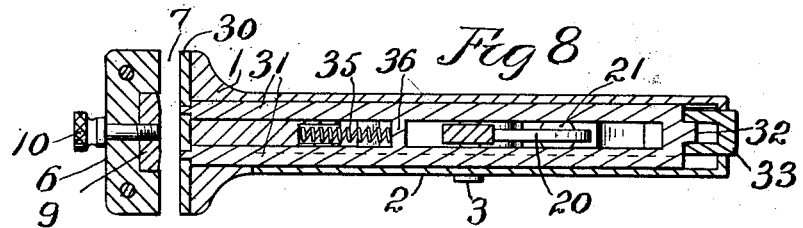
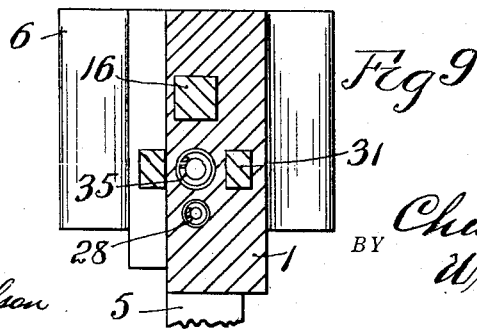
INVENTOR
Charles K. Harris
BY Warren D. House.
His ATTORNEY
Witness
H. Vernon Olson Patented Nov. 8, 1932

1,887,350

UNITED STATES PATENT OFFICE

CHARLES K. HARRIS, OF KANSAS CITY, MISSOURI

SAW SET

Application filed July 12, 1930. Serial No. 467,512.

My invention relates to improvements in saw sets.

One of the objects of my invention is to provide a novel saw set with which the teeth of a saw may be easily and quickly and accurately set.

My invention provides further novel means by which the saw blade may be easily and firmly held during the setting operation.

A further object of my invention is the provision of a novel support for the tooth setting mechanism, said support having a handhold adapted to be gripped by the hand which actuates the tooth setting mechanism.

My invention provides further novel means by which the set of the teeth may be varied as to the degree of angle to which they are set.

My invention provides further novel means for varying the tension of a spring which forces the hammer to the striking position.

My invention provides still further a saw set which is simple, cheap, durable, not likely to get out of order, which is strong, easily operated, rapid in its operation, and which is efficient in its operation.

The novel features of my invention are hereinafter fully described and claimed.

In the accompanying drawings, which illustrate the preferred embodiment of my invention, Fig. 1 is a side elevation of my improved saw set.

Fig. 2 is a longitudinal vertical sectional view of the same, showing the hammer cocked and released from the trigger, the latter being shown pulled back from its initial position.

Fig. 3 is a section on the line 3—3 of Fig. 2.

Fig. 4 is an enlarged rear elevation of the trigger.

Fig. 5 is a section on the line 5—5 of Fig. 4.

Fig. 6 is a section on the line 6—6 of Fig. 7, showing the hammer in the striking position, and the trigger in its initial position.

Fig. 7 is a top view of the saw set.

Fig. 8 is a section on the line 8—8 of Fig. 6.

Fig. 9 is an enlarged section on the line 9—9 of Fig. 6.

Fig. 10 is a side elevation, enlarged, of the anvil.

Fig. 11 is an end elevation, enlarged, of the anvil.

Similar reference characters designate similar parts in the different views.

My improved saw set is provided with a support comprising a body 1 and a side plate 2, which is releasably held to the body 1 by a shouldered screw 3 fitted at its threaded shouldered end in a threaded hole in the body, Figs. 1, 2 and 3.

The support is provided with a handhold 4 having the form of a pistol grip. The general form of the support is that of a pistol. It is provided forward of the handhold 4 with a trigger guard 5. The forward end of the set, however, has a widened portion comprising a head 6, the under side of which has a vertical slot 7 adapted to receive a saw blade 8, Fig. 2.

In the head 6 at the forward side of the slot 7 is a rotatably adjustable circular anvil 9 having a central threaded hole in which is fitted the rear end of a horizontal screw 10 rotatable in a hole which extends rearwardly from the front side of the head 6, the head of the screw, when the latter is tightened, bearing against the front side of the head.

The rear end of the anvil 9, adjacent to its periphery, is provided with a circular row of recesses 11 of different depths and adapted each to receive therein a tooth 12 of the saw, Fig. 2.

The upper side of the head 6 over the anvil 9 has a tapered observation opening 13, the forward wall of which has an indicating mark 14, Fig. 7, which is adapted to aline with each of a peripheral row of small holes 15, respectively disposed centrally with respect to the recesses 11 of the anvil.

Horizontally reciprocative in a longitudinal hole in the body 1, which hole is disposed in the vertical plane of the axis of the anvil 9, is a tooth setting plunger 16, Figs. 2, 6, 7 and 9, said plunger being in the horizontal plane of the recess 11 which at the time is in the uppermost position.

The forward end of the plunger 16 is upwardly and forwardly bevelled, as shown in Figs. 2 and 6, and is adapted to strike the tooth 12, which at the time registers with the uppermost recess 11, and force said tooth forwardly into said recess, thus imparting to the tooth the desired angle of set.

The plunger 16 is normally retracted from the tooth striking or setting position to the position shown in Fig. 2, by a coil spring 17, Figs. 2 and 6, which encircles the rear portion of the plunger 16, the rear end of the spring being extended into a peripheral hole in the plunger, and the forward end of the spring bearing against a washer 18 in which the plunger is slidable, and which bears at its front side against the body 1.

For driving the plunger 16 forwardly to the setting position, there is provided a hammer 19 which is oscillative on the screw 3, Figs. 2 and 6, between a cocked position, shown in Fig. 2 and the plunger striking position, shown in Fig. 6.

The hammer 19 when released, after being cocked to the position shown in Fig. 2, strikes the rear end of the plunger 16 and forces the latter forwardly, against the pressure of the retracting spring 17, to the tooth setting position shown in Fig. 6.

For normally forcing the hammer 19 to the striking position, there is provided yielding means, which, as shown in Figs. 2 and 6 comprises a spring plate 20, the upper end of which bears against the rear edge of the hammer 19, and the lower end of which is mounted in a slot in the upper side of a button 21, which is rotatably mounted on the upper end of a vertical screw 22, which is fitted in a threaded hole in the lower end of the handhold 4, Figs. 2 and 6.

By vertically adjusting the screw 22, the tension of the spring plate 20 may be changed.

For cocking and then releasing the hammer 19, there is pivotally mounted on a transverse pin 23 mounted in holes in the body 1 and side plate 2, a trigger 24, which in general form corresponds to the usual pistol trigger, and which is oscillative on the pin 23, within the space enclosed by the trigger guard 5, from an initial position, shown in Fig. 6.

The trigger 24 is provided with a pawl 25, which is normally held by a spring 26 in position for operatively engaging a tooth 27 provided on the forward edge of the hammer 19, Figs. 2 and 6.

The trigger 24 is so disposed forward of the handhold 4 as to be engaged by a finger of the hand which grips the handhold 4. Upon the operator pulling the trigger 24 rearwardly from the initial position shown in Fig. 6 to the position shown in Fig. 2, the trigger pawl 25 will, through the intermediacy of the tooth 27, cock the hammer 19 and then release the latter.

Upon the hammer 19 being released from the pawl 25, the spring plate 20 will suddenly and forcibly swing the hammer against the rear end of the plunger 16, thus driving the latter forwardly against the tooth 12 of the saw blade which at the time is alined with the plunger, thereby bending the tooth into the adjacent recess 11.

For retracting the trigger 24 to the intial position, after the operator releases the trigger, there is provided a coil spring 28, the rear end of which bears against the trigger at the forward edge thereof above the pivot pin 23, and the forward end of which spring 28 is mounted in a horizontal hole in the body 1, the spring bearing at its forward end against said body, Figs. 2, 6 and 9.

For holding the saw blade 8 tightly against the fixed jaw 29 of the head 6, when the blade is inserted in the slot 7, with a tooth to be set registering with the uppermost recess 11 of the anvil 9, there is provided a forwardly and rearwardly movable jaw comprising a plate 30 disposed edge-up in the slot 7 at the rear of the fixed jaw 29 and adapted to cooperate therewith. Said plate 30 is fastened to the front end of a horizontal rearwardly extending bar 31 which is horizontally and forwardly and rearwardly reciprocative in holes provided therefor in the body 1.

The bar 31 is U-shaped, the front ends of the arms thereof being attached to the plate 30, as shown in Fig. 8. The rear end of the bar 31, has a projection 32 disposed in a hole in the upper end of an upright lever 33 pivoted at its lower end on a transverse pin 34 to the body 1 within the handhold 4, Figs. 1, 2, 6 and 8.

The rear edge of the lever 33 projects rearwardly from the handhold 4, as shown, so that, when the hand grips the handhold 4, the lever will be forced forwardly.

Upon the lever 33 being forced forwardly it will force forwardly the bar 31, which will press the plate 30 against the saw blade 8, thus holding the latter in the position to which it has been adjusted with respect to the anvil 9.

To retract the lever 33, bar 31 and plate 30 from the clamping position, there is provided a horizontal coil spring 35, Figs. 2, 6, 8 and 9, the rear end of which bears against a bridge portion 36 between the arms of the bar 31. The forward end of the spring 35 is mounted in a hole in the body 1, the front end of said spring having a bearing against said body.

In the operation of the device, the screw 10 is loosened and the anvil 9 then turned to a position in which the desired recess 11 will be alined with the plunger 16.

The saw blade 8 is then inserted into the slot 7 with the tooth 12 of the saw blade, which tooth is to be set, registering with the uppermost recess 11 of the anvil and alined with the plunger 16. The operator then tightly grips the handhold 4, thus through the lever 33 and bar 31 forcing the clamping plate 30 tightly against the rear side of the saw blade 8, thus holding the blade tightly against the fixed jaw 29.

The operator then, with his forefinger of the hand grasping the handhold 4, pulls rearwardly the trigger 24 from its initial position, Fig. 6 to the position shown in Fig. 2. The trigger, as has been described, will then, through the pawl 25 and tooth 27 of the hammer, swing the hammer 19 to the cocked position, shown in Fig. 2, and will then release the hammer, at which time, the spring plate 20 will swing the hammer 19 against the rear end of the plunger 16, thus forcing the latter forwardly to set the tooth which alines therewith.

Upon the operator releasing the pressure on the lever 33 and upon the trigger 24, the spring 35 will retract the plate 30, the bar 31 and lever 33, and the saw blade will be freed.

The spring 28 will retract the trigger 24 to the initial position, shown in Fig. 6, and the pawl 25 of the trigger will again engage operatively the tooth 27 of the hammer 19.

Upon again pulling rearwardly a short distance on the trigger 24, the hammer 19 will release the plunger 16, upon which the saw blade may be moved to the next position for the setting of another tooth, after which the operation hereinbefore described will be repeated. It will be noted that the mechanism for clamping the saw blade by the movable jaw 30 against the fixed jaw 29, is operable independently of the trigger mechanism for cocking and releasing the hammer. This construction enables the more accurate positioning of the blade with relation to the anvil 9, and permits of the trigger being actuated two or more times, if desired, without releasing the blade, in case that one blow of the hammer does not sufficiently set the tooth struck by it.

I do not limit my invention to the structure shown and described, as many modifications, within the scope of the appended claims, may be made without departing from the spirit of my invention.

What I claim is:—

1. In a saw set, the combination with a support having a fixed jaw and a handhold, an anvil on said jaw, a tooth setting plunger co-operating with said anvil, and means including a trigger disposed forwardly of said handhold in position for being engaged and retracted by a finger of the hand holding the handhold for actuating said plunger for setting a saw tooth, of a movable jaw movable independently of said trigger to and from a position in which it is adapted to clamp a saw blade against said fixed jaw with a tooth of the saw in the path of said plunger, and means operable independently of said trigger for forcing said movable jaw to the clamping position.

2. In a saw set, the combination with a support having a fixed jaw and a handhold, an anvil on said jaw, a tooth setting plunger co-operating with said anvil, and means including a trigger disposed forwardly of said handhold in position for being engaged and retracted by a finger of the hand holding the handhold for actuating said plunger for setting a saw tooth, of a movable jaw movable independently of said trigger to and from a position in which it is adapted to clamp a saw blade against said fixed jaw with a tooth of the saw in the path of said plunger, a lever pivoted to said support and movable independently of said trigger, and means actuated by said lever for moving said movable jaw to the clamping position.

3. In a saw set, the combination with a support having a fixed jaw and a handhold, an anvil on said jaw, a tooth setting plunger co-operating with said anvil for setting a saw tooth, and means including a trigger disposed forwardly of said handhold in position for being engaged and retracted by a finger of the hand holding the handhold, of a bar reciprocative on said support, a movable jaw carried by said bar and movable to and from a position in which it is adapted to clamp a saw blade against said fixed jaw with a tooth of the saw in the path of said plunger, and a lever pivoted to said support and movable independently of said trigger and engaging and adapted to move said bar to the setting position and operative for so moving said bar by a hand grasping said handhold.

4. In a saw set, the combination with a support having a fixed jaw and a handhold, an anvil on said jaw, a tooth setting plunger cooperating with said anvil for setting a saw tooth, and means including a trigger disposed forwardly of said handhold in position for being engaged and retracted by a finger of the hand holding the handhold of a bar reciprocative on said support, a movable jaw carried by said jaw and movable to and from a position in which it is adapted to clamp a saw blade against said fixed jaw with a tooth of the saw in the path of said plunger, a lever pivoted to said support and movable independently of said trigger and engaging and adapted to move said bar to the setting position and operative by a hand grasping said handhold, and a spring engaging said support and said bar for retracting the latter from the setting position.

In testimony whereof I have signed my name to this specification.

CHARLES K. HARRIS.